(12) United States Patent
Biallas et al.

(10) Patent No.: US 10,914,348 B2
(45) Date of Patent: Feb. 9, 2021

(54) CONTROL SYSTEM AND METHOD FOR A VEHICLE HAVING A CONTINUOUSLY VARIABLE TRANSMISSION

(71) Applicants: Hyundai Motor Company, Seoul (KR); KIA Motors Corporation, Seoul (KR)

(72) Inventors: Tucker Biallas, Cape Coral, FL (US); Taijin Jung, Suwon-si (KR); HyungHee Lee, Yongin-si (KR); Se Jin Kim, Suwon-si (KR); Ju Hyun Nam, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 77 days.

(21) Appl. No.: 16/299,515

(22) Filed: Mar. 12, 2019

(65) Prior Publication Data
US 2020/0292072 A1    Sep. 17, 2020

(51) Int. Cl.
*F16D 48/06*    (2006.01)
*F16H 61/66*    (2006.01)

(52) U.S. Cl.
CPC ...... *F16D 48/06* (2013.01); *F16D 2500/3067* (2013.01); *F16D 2500/30415* (2013.01); *F16D 2500/30816* (2013.01); *F16D 2500/3118* (2013.01); *F16D 2500/5075* (2013.01); *F16D 2500/70426* (2013.01); *F16H 2061/6618* (2013.01)

(58) Field of Classification Search
CPC .......... F16D 48/06; F16D 2500/30415; F16D 2500/3067; F16D 2500/30816; F16D 2500/3118; F16D 2500/5075; F16D 2500/70426; F16H 2061/6618
See application file for complete search history.

(56) References Cited

U.S. PATENT DOCUMENTS

| | | | |
|---|---|---|---|
| 7,678,016 B2 | 3/2010 | Nakayama | |
| 9,989,146 B1 | 6/2018 | Abington et al. | |
| 10,358,030 B2* | 7/2019 | Sagefka | B60K 17/354 |
| 2017/0096061 A1* | 4/2017 | Sagefka | F16D 48/06 |

* cited by examiner

*Primary Examiner* — David R Morris
(74) *Attorney, Agent, or Firm* — Brinks Gilson & Lione

(57) ABSTRACT

A vehicle control system in a vehicle having a continuously variable transmission (CVT) system with a clutch mechanism modulates a torque capacity of the clutch mechanism. The CVT system in the vehicle further includes a primary pulley, a secondary pulley and a CVT belt for transmitting a torque to wheels from a power source rotatably connected with an input shaft. The clutch mechanism includes a forward (FWD) clutch between the power source and a CVT pulley assembly. The vehicle control system detects a wheel slip of the CVT system and controls a torque capacity of the FWD clutch, and the system is configured for avoiding a slip of the CVT belt by dissipating a spike torque generated by the wheel slip.

16 Claims, 6 Drawing Sheets

FIG. 2 "PRIOR ART"

CONTROL SYSTEM AND METHOD FOR A VEHICLE HAVING A CONTINUOUSLY VARIABLE TRANSMISSION

FIELD

The present disclosure relates to a control system and method for a vehicle having a continuously variable transmission (CVT) system, and more particularly relates to a control system and method for controlling a clutch mechanism in the vehicle.

BACKGROUND

The statements in this section merely provide background information related to the present disclosure and may not constitute prior art.

Powertrain systems for vehicles generate and transfer torque to a driveline to propel the vehicle in response to an operator command. Generally, torque is generated by an internal combustion engine and non-combustion torque machine(s) in hybrid powertrain systems. Powertrain systems having the internal combustion engine coupled to a continuously or infinitely variable transmission (CVT) may be employed to provide tractive effort in vehicles. In the CVT equipped in the powertrain system of the vehicle, there are a belt-type continuously variable transmission, a toroidal-type continuously variable transmission and so on. A characteristic of the CVT includes the capability to continuously change a speed ratio, and the CVT is capable of steplessly changing through an infinite number of effective gear ratios between a maximum gear ratio and a minimum gear ratio.

A continuously variable transmission (CVT) mechanism incorporated in the belt-type continuously variable transmission includes two pulleys—a primary pulley attached to an input shaft and a secondary pulley attached to an output shaft, each having two sheaves, and a drive belt wound around these pulleys. In addition, frictional engagement between the sheaves of each pulley and the belt couples the belt to each of the pulleys to transfer torque from one pulley to the other. The gear ratio is the ratio of torque of the secondary pulley to the torque of the primary pulley, and the gear ratio may be changed by moving the two sheaves of one of the pulleys closer together and the two sheaves of the other pulley farther apart. Accordingly, the CVT mechanism controls a gear ratio continuously by changing a diameter of a loop of the drive belt.

A continuously variable transmission (CVT) mechanism incorporated in the toroidal-type continuously variable transmission includes discs and roller mechanisms that transmit power between the discs. The toroidal continuously variable transmission includes at least one input disc rotatably coupled to a torque generator, e.g., an internal combustion engine, and at least one output disc rotatably coupled to the transmission output. The roller mechanisms sandwiched between input discs and output discs. Accordingly, it controls a torque transmission ratio continuously by changing a contact radius of the rollers against each disc.

The above information disclosed in this Background section is only for enhancement of understanding of the background of the present disclosure, and therefore it may contain information that does not form the prior art.

SUMMARY

The present disclosure provides a vehicle control system and method in a vehicle having a continuously variable transmission (CVT) system including a CVT pulley assembly and a clutch mechanism for transmitting a torque to wheels from a power source rotatably connected with an input shaft.

According to one aspect of the present disclosure, the vehicle control system includes a communicator operable to detect a real time speed of at least of the wheels and a controller operable to evaluate an allowable target speed of the input shaft. The controller determines to activate the vehicle control system by comparing the real time speed of the at least one of the wheels to the allowable target speed. In addition, the controller modulates a torque capacity of the clutch mechanism by activating the system when the controller determines a wheel slip of the CVT system.

According to a further aspect of the present disclosure, the controller determines as the wheel slip when the detected real time speed of the at least one of the wheels exceeds the evaluated allowable target speed of the input shaft.

According to a further aspect of the present disclosure, the controller lowers the torque capacity of the clutch mechanism for dissipating a spike torque generated by the wheel slip.

According to a further aspect of the present disclosure, the clutch mechanism a forward (FWD) clutch for transmitting the torque to the CVT pulley assembly from the power source. The FWD clutch is rotatably connected with the input shaft and a primary shaft between the power source and the primary pulley.

According to one aspect of the present disclosure, the clutch mechanism includes an aft clutch rotatably connected with a secondary shaft between a secondary pulley and the wheels.

According to a further aspect of the present disclosure, the controller modulates the torque capacity of the clutch mechanism by communicating with a hydraulic pressure control.

According to one aspect of the present disclosure, the controller modulates the torque capacity of the clutch mechanism by communicating with an electronic actuator.

According to one aspect of further aspect of the present disclosure, a method for controlling a clutch mechanism in a vehicle having a continuously variable transmission (CVT) system including a CVT pulley assembly, the clutch mechanism and a controller for transmitting a torque to wheels from a power source rotatably connected with an input shaft includes steps of detecting a real time speed of at least speed of at least one of the wheels, evaluating an allowable target speed of the input shaft, determining an wheel slip in the CVT system by comparing the real time speed of the at least one of the wheels to the allowable target speed, activating the controller when the wheel slip is determined, and modulating a torque capacity of the clutch mechanism for dissipating a spike torque generated by the wheel slip.

According to a further aspect of the present disclosure, the wheel slip is determined when the detected real time speed of the at least one of the wheels exceeds the evaluated allowable target speed of the input shaft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
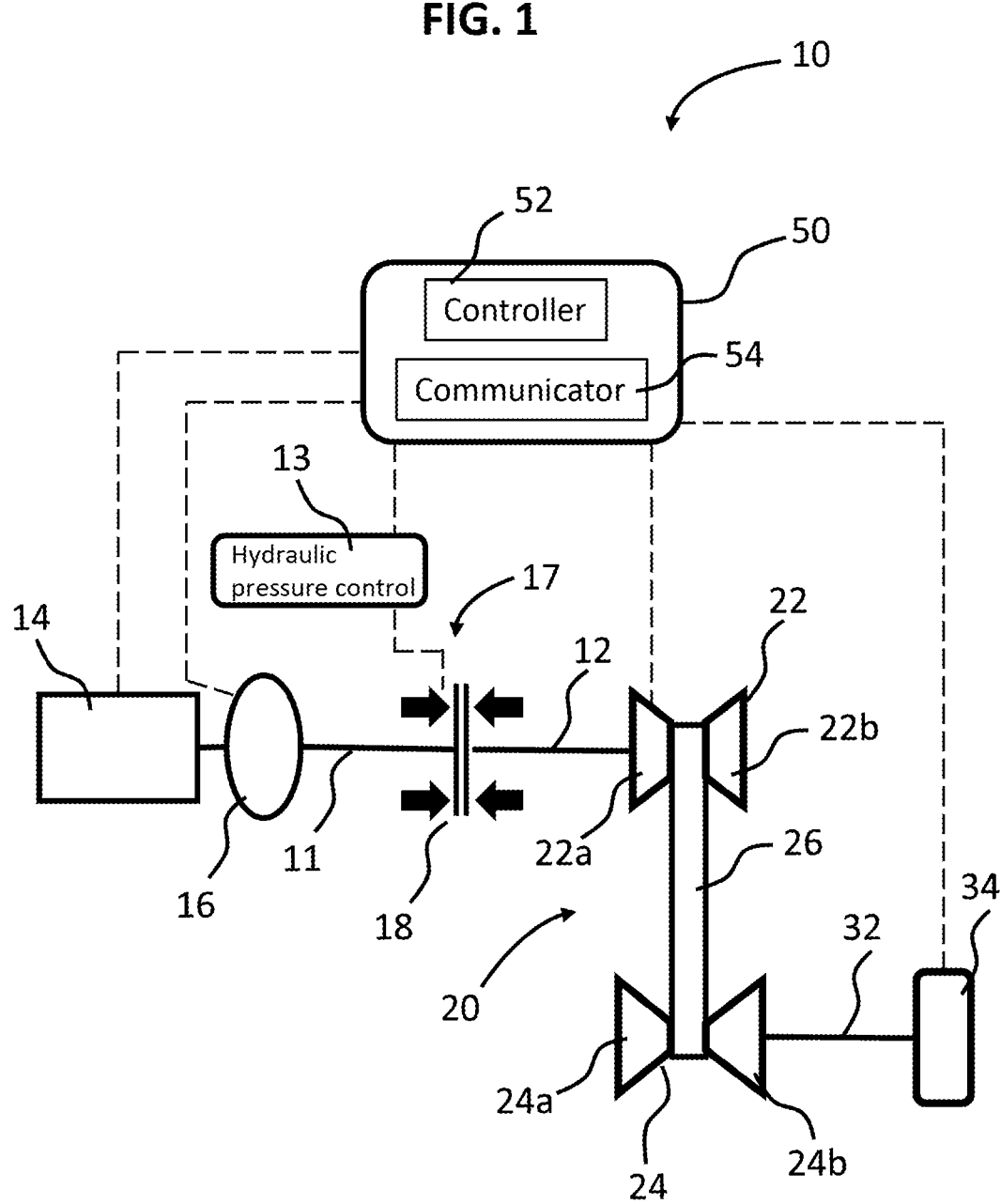
FIG. 1 shows a schematic view of a continuously variable transmission (CVT) system in accordance with an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application or uses. It should be understood that throughout the drawings, corresponding reference numerals indicate like or corresponding parts and features.

Although an exemplary form is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present disclosure may be formed as non-transitory computer readable media on a computer readable medium containing executable program instruction executed by a processor, controller or the like. Examples of the computer readable mediums include, but are not limited to. ROM, RAM, compact disc (CD)-ROMs, magnetic tapes, floppy disks, flash drives, smart cards and optical data storage devices.

FIG. 1 illustrates a continuously variable transmission (CVT) system 10 controlled by a vehicle control system 50 including a controller 52 and a communicator 54. As shown in FIG. 1, the continuously variable transmission system 10 is a belt type continuously variable transmission system including a primary shaft 12 driven by a power source 14, and a secondary shaft 32 in parallel with the primary shaft 12. A rotation of the primary shaft 12 is transmitted to the secondary shaft 32 through a continuously variable transmission (CVT) pulley assembly 20 which changes the transmitted rotation continuously. A rotation of the secondary shaft 32 is transmitted to wheels 34.

As shown in FIG. 1, the power source 14 is rotatably coupled to the CVT pulley assembly 20 and a clutch mechanism 17 by an input shaft 11 and the primary shaft 12. In FIG. 1, for example, if an internal combustion engine is used as one of the power sources 14, the CVT system further includes a torque converter 16. According to other forms of the present disclosure, however, when an electric motor is used as one of the power source 14, the torque converter 16 could be omitted. So the electric motor is rotatably and directly coupled to the clutch mechanism 17 by the input shaft 11 without the torque converter 16. The wheels 34 are rotatably coupled to the CVT pulley assembly 20 by the secondary shaft 32. In addition, operation of the CVT system 10 is monitored and controlled by the controller 52 in the vehicle control system 50 in response to driver commands and other vehicle operation factors.

In FIG. 1, when the internal combustion engine is used as the power source 14, the torque converter 16 is rotatably coupled with the input shaft 11 and may be a device providing fluidic coupling between its input and output members for transferring the torque transmitted from the engine. In accordance with other forms of the present disclosure, the torque converter 16 could be omitted. As shown in FIG. 1, the torque converter 16 rotatably couples to the clutch mechanism 17 and serves as an input to the CVT pulley assembly 20.

As shown in FIG. 1, for example, when the internal combustion engine with the torque converter 16 is used as the power source 14, the clutch mechanism 17 is configured to switch the direction of the torque transmitted from the engine as the power source 14 and includes a plurality of gear sets (not shown), a reverse brake (not shown) and a forward (FWD) clutch 18. The FWD clutch 18 is selectably engageable to connect the torque converter 16 and the CVT pulley assembly 20 so that these elements rotate together as a single unit. For example, when both the FWD clutch 18 and the reverse brake are released, the input shaft 11 and the primary shaft 12 are decoupled, and the clutch mechanism 17 becomes the neutral condition such that it doesn't transmit power to the primary shaft 12. When the FWD clutch 18 is engaged on the condition that the reverse brake is released, a rotation of the input shaft 11 is transmitted to the CVT pulley assembly 20 without change. On the other hand, when the reverse brake is engaged on the condition that the FWD clutch 18 is released, a negative rotation of the input shaft 11 is transmitted to the CVT pulley assembly 20. Accordingly, the engine is then operable to drive the CVT pulley assembly 20 in a forward direction or a rearward direction. In accordance with other forms of the present disclosure, the torque converter 16, the clutch mechanism 17 and the CVT pulley assembly 20 could be interconnected in a different manner and still achieve the forward-reverse switching.

In FIG. 1, the CVT pulley assembly 20 includes a primary pulley 22 as a driving pulley, a secondary pulley 24 as a driven pulley and a continuously variable transmission (CVT) belt 26. For example, a belt-type CVT system 10 may be advantageously controlled by the vehicle control system 50. The primary pulley 22 provided on the primary shaft 12 has a first sheave 22a incorporated with the primary shaft 12 as a stationary sheave and a second sheave 22b opposed to the first sheave 22a as a movable sheave in an axial direction of the primary shaft 12. The secondary pulley 24 provided on the secondary shaft 32 has a third sheave 24a incorporated with the secondary shaft 32 as a stationary sheave and a fourth sheave 24b opposed to the third sheave 24a as a movable sheave in an axial direction of the secondary shaft 32.

In FIG. 1, the CVT belt 26 is shown wound around the primary pulley 22 and the secondary pulley 24. In accordance with other forms of the present disclosure, a chain or any flexible continuous rotating device can be implemented for transferring the torque between the primary pulley 22 and the secondary pulley 24. A diameter of a loop of the CVT belt 26 looped around the primary pulley 22 and a diameter of a loop of the CVT belt 26 looped around the secondary pulley 24 are varied continuously by changing a width between the primary pulley 22 and the secondary pulley 24. A speed ratio of the continuously variable transmission pulley assembly 20 is defined by a ratio of a CVT output speed and a CVT input speed. Thus, the distance between the first and second sheaves 22a and 22b may be varied by moving the second sheave 22b along the axial direction of the primary shaft 12 to change the position of the CVT belt 26 on a groove of the first and second sheaves 22a and 22b. Likewise, the distance between the third and fourth sheaves 24a and 24b may be also varied by moving the fourth sheave 24b along the axial direction of the secondary shaft 32 to change the ratio of the CVT pulley assembly 20.

In order to vary the speed ratio of the CVT pulley assembly 20 and to transfer a torque to the wheels 34, a clamping force (applied through hydraulic pressure) may be applied to one of the primary or secondary pulleys 22 and 24 via one or more pulley actuators (not shown). The clamping force effectively squeezes the second sheave 22b and the fourth sheave 24b of the primary and secondary pulleys 22 and 24 respectively to change the distance between the first and second sheaves 22a and 22b in the primary pulley 22, and the third and fourth sheaves 24a and 24b in the secondary pulley 24. As described above, variation of the distance between the sheaves causes the rotatable CVT belt 26 to move higher or lower on the surface of each of the sheaves 22a, 22b, 24a and 24b. Due to the variation of the distance between them, the speed ratio of the CVT pulley assembly 20 may be varied.

The clamping force in each of the primary and secondary pulleys 22 and 24 may be also applied to transfer a desired amount of torque from the primary pulley 22 to the secondary pulley 24 through the CVT belt 26, where the amount of the clamping force applied is intended to avoid a slip of the CVT belt 26. However, when the torque inputted to the CVT pulley assembly 20 is larger than the friction force or shearing force, the slip of the CVT belt 26 occurs. For example, a disturbance in output torque may cause the CVT belt 26 to slip within the primary or secondary pulley 22 and 24 because a spike torque generated by the disturbance condition is larger than the friction force on the surface on the sheaves 22a, 22b, 24a and 24b of the primary or secondary pulley 22 and 24. As an external source, an abrupt road condition such as an icy, snowing or raining road can cause a rapid wheel speed of the vehicle due to the slip of the wheels 34. Due to this, the wheel inertia torque as the spike torque transmits additional torque to the CVT pulley assembly 20 through the secondary shaft 32. Accordingly, the additional torque could cause the slip of the CVT belt 26 and result in a surface damage of the sheaves in the primary and secondary pulley 22 and 24.

For avoiding the slip of the CVT belt 26, as shown in FIG. 1, the vehicle control system 50 including the controller 52 and the communicator 54 utilizes the FWD clutch 18 rotatably coupled with the CVT pulley assembly 20 by the primary shaft 12. The controller 52 is operable to modulate an existing pressure control of the FWD clutch 18 for dissipating the spike torque generated by the slip of the wheels 34. In a conventional CVT system, for example, the vehicle control system is operable to increase the clamping force in each of the primary and secondary pulleys for avoiding the slip of the CVT belt or chain, but there are limitations for increasing the clamping force. Accordingly, in the present disclosure, the controller 52 in the vehicle control system 50 operates the CVT system 10 by communicating with one or more sensors or sensing devices (not shown) that are installed in each component of the CVT system 10 for controlling and protecting the possible slip of the CVT belt 26.

Figure 5:
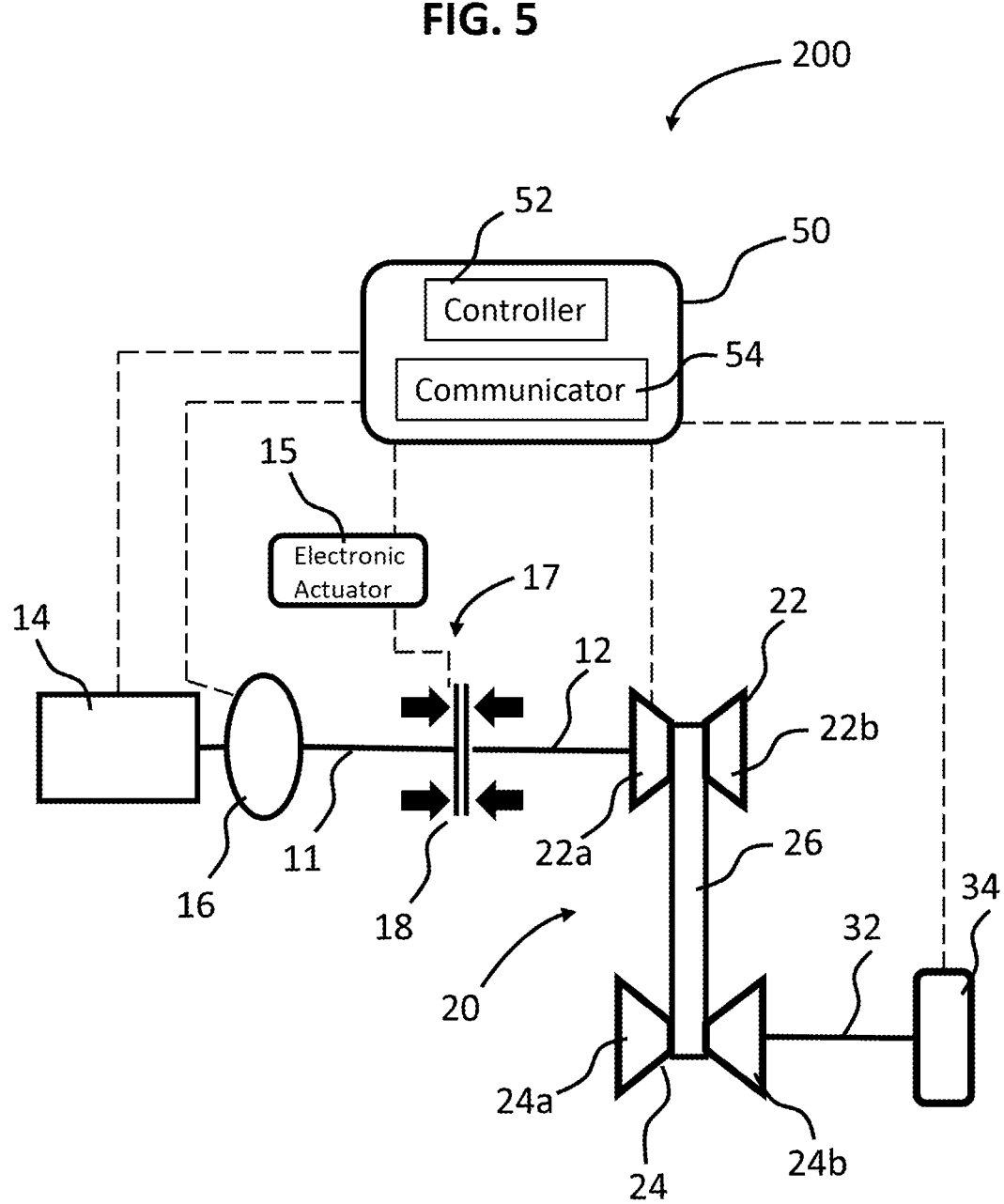
FIG. 5 is a schematic view of a CVT system in accordance with another exemplary form of the present disclosure.

As described above, the vehicle control system 50 controls the FWD clutch 18 for dissipating the spike torque generated from the wheel 34 due to the abrupt road condition. The controller 52 modulates the clutch mechanism 17 by communicating with a hydraulic pressure control 13 such as a solenoid coil for adjusting the torque capacity of the FWD clutch 18. In accordance with other forms of the present disclosure, other pressure control methods for the clutch mechanism 17 may be implemented. In FIG. 5, for example, instead of the hydraulic pressure control 13, an electronic actuator 15 could be used in a CVT system 200. The controller 52 can communicate with the electronic actuator 15 to modulate the torque capacity of the FWD clutch 18.

Referring back to FIG. 1, the controller 52 activates the control system 50 for lowering the torque capacity of the FWD clutch 18 when the spike torque is generated in the CVT system 10 due to the slip of the wheels 34. In the activation of the control system 50, the torque capacity of the FWD clutch 18 holds at a partial level for delivering the transmitted torque from the power source 14 while reducing for potential of extra torque such as the spike torque from the wheels 34 due to the abrupt road condition. When the spike torque as an excessive torque is delivered during partial torque capacity of the FWD clutch 18, the excessive torque in FWD clutch 18 will cause a speed flare (clutch slippage) of the power source 14 allowing only appropriate torque (same level as the torque amount of the power source 14) to be delivered. Accordingly, the vehicle control system 50 controls the torque capacity of the FWD clutch 18 for avoiding the slip of the CVT belt 26 in the CVT pulley assembly 20 as a torque fuse method.

Figure 2:
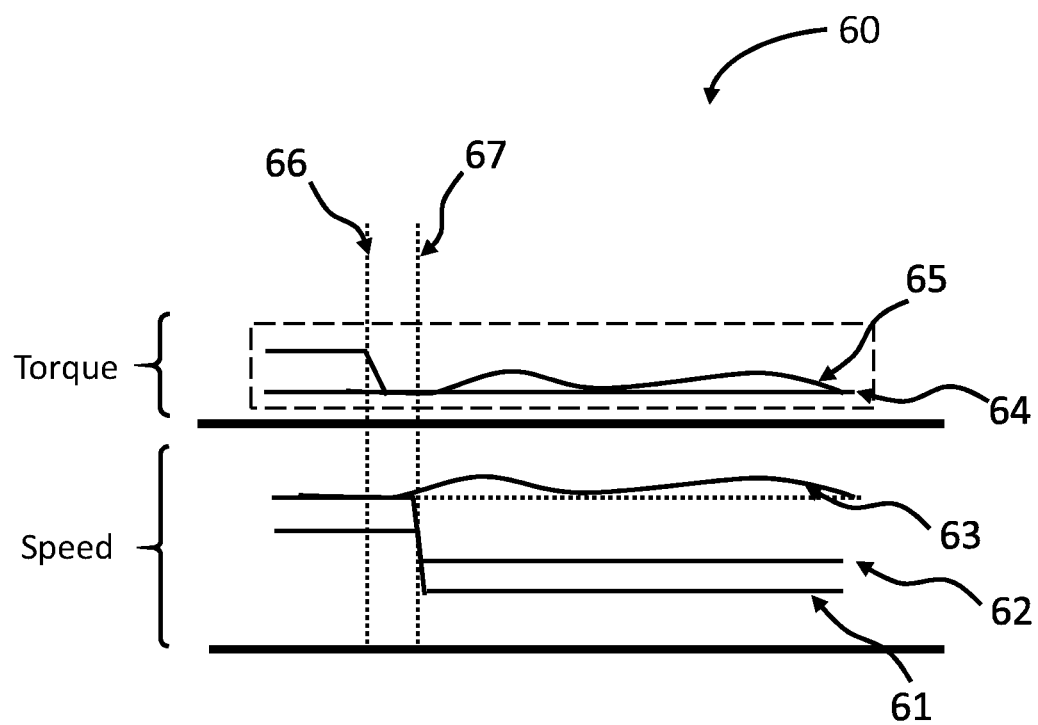
FIG. 2 is a graph illustrating a controlled torque capacity of a forward (FWD) clutch when an wheel slip is happened according to the related art.

FIG. 2 shows a graph 60 for controlling the torque capacity of the FWD clutch 18 when the spike torque is generated from the wheels 34 due to the abrupt road condition. In the graph 60, a line 61 shows a speed $N_s$ of the secondary pulley 24, and a line 62 shows a speed $N_p$ of the primary pulley 22. A line 63 shows a speed $N_i$ of the input shaft 11 transmitted from the power source 14, a line 64 shows a torque $T_p$ of the power source 14 and a line 65 shows a torque $T_{c\_fwd}$ of the FWD clutch 18. In FIG. 2, a first vertical line 66 shows when the controller 52 detects the slip of the wheels 34 due to the abrupt road condition. As described above, when the slip of the wheels 34 is occurred, the controller 52 determines to activate the vehicle control system 50 for dissipating the spike torque caused by the slip of the wheels 34. By the activation of the vehicle control system 50, the torque capacity of the FWD clutch 18 (see the line 65) is adjusted between the first vertical line 66 and a second vertical line 67, and the spike torque is controlled by the vehicle control system 50. Accordingly, from the second vertical line 67 of the graph 60, the speed $N_i$ of the input shaft 11 and the torque $T_{c\_fwd}$ of the FWD clutch 18 are controlled even though the spike torque generated by the slip of the wheels 34 is transmitted to the CVT system 10, and a slip of the CVT belt 26 in the CVT system 10 can be avoided.

Figure 3:
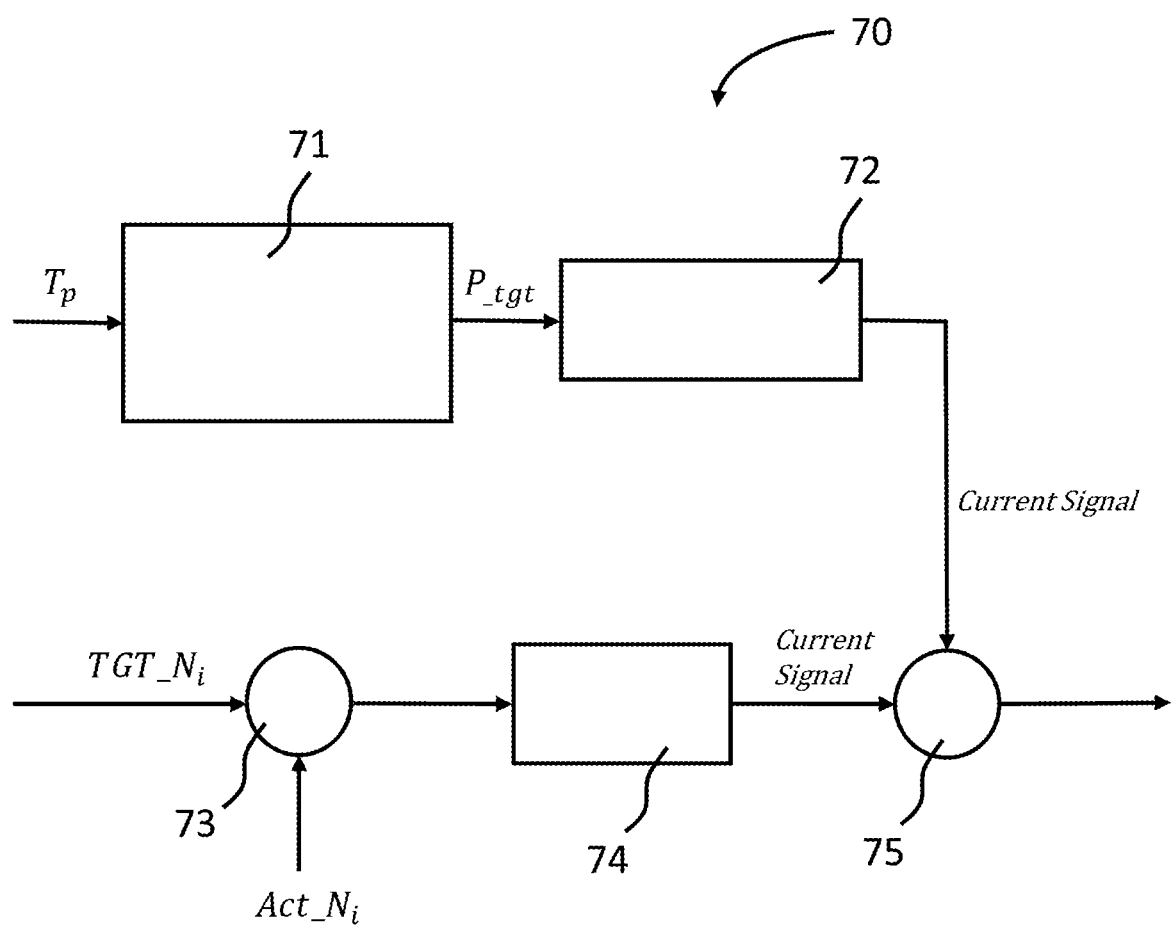
FIG. 3 is a logic diagram illustrating the operation of the vehicle control system in accordance with the exemplary form of the present disclosure

Referring to FIG. 3, a logic diagram 70 is illustrated for modulating the clutch mechanism 17 by the controller 52 as the torque fuse method. In a block 71, the controller 52 evaluates target pressure values $P_{tgt}$ of each of the FWD clutch 18 and the CVT pulley assembly 20 based on the measured torque $T_p$ of the power source 14. In a block 72, the controller 52 converts the evaluated pressure values to current signals for communicating with each of the FWD clutch 18 and the CVT pulley assembly 20 by the communicator 54. In a circle block 73, the controller 52 compares an allowable target speed TGT_$N_i$ of the input shaft 11 as a predetermined value with the detected real time speed Act_$N_i$ of the input shaft 11 generated by the slip of the wheels 34. For example, in a system with the internal combustion engine as the power source 14, the controller 52 may determine an allowable target speed TGT_$N_i$ of the input shaft 11 by adding a target slip speed to a speed $N_p$ of the primary pulley 22. If the real time speed Act_$N_i$ is greater than the allowable target speed TGT_$N_i$, the controller 52 modulates the pressure of the FWD clutch 18 and sends a signal to the hydraulic pressure control 13 in a block 74. In a circle block 75, the controller 52 provides the controlled signal to the CVT system 10 for avoiding the slip of the CVT belt 26 due to the spike torque generated by the slip of the wheels 34.

Figure 4:
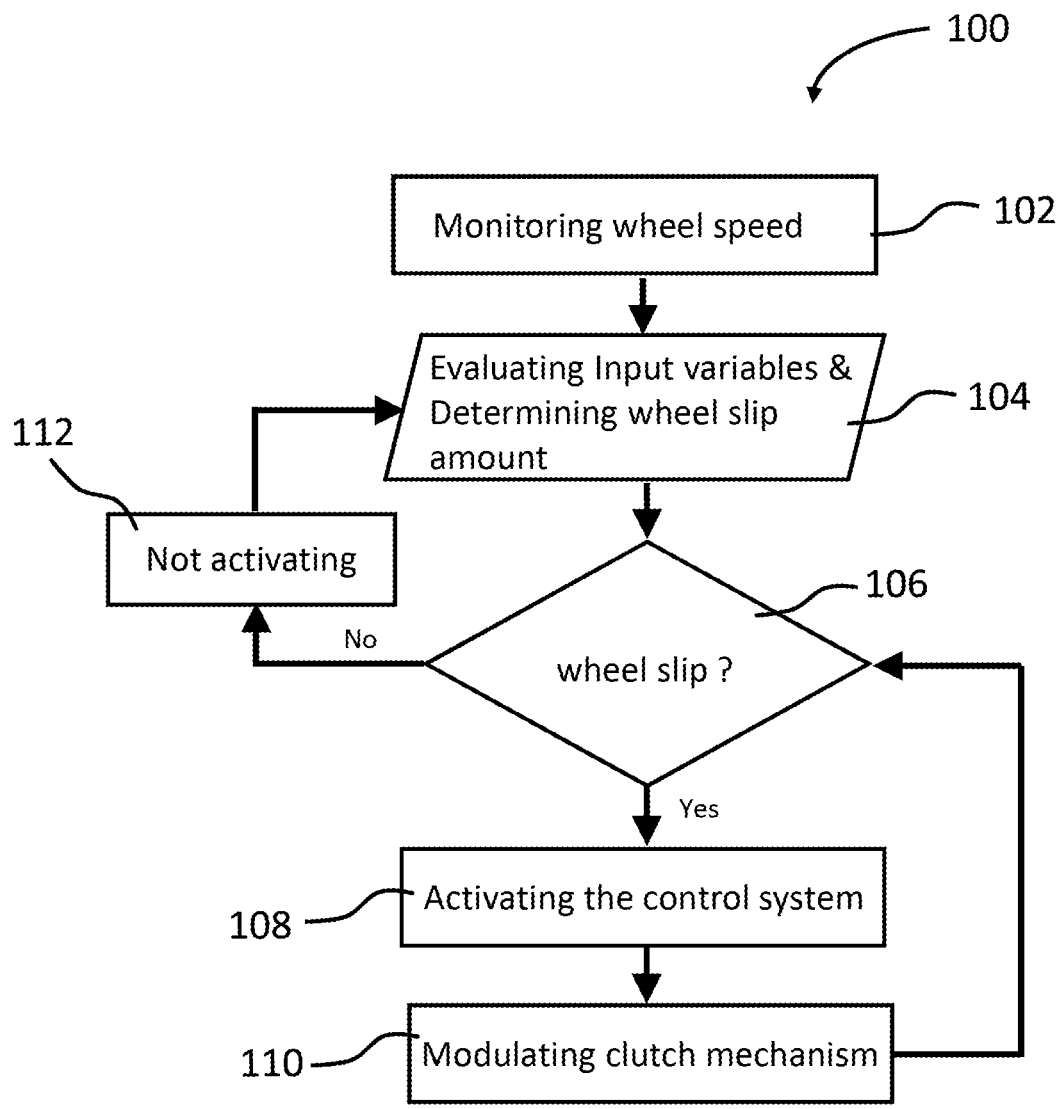
FIG. 4 is a flow chart illustrating an operation of a vehicle control system in accordance with the exemplary form of the present disclosure.

FIG. 4 shows a flow chart 100 of the vehicle control system 50 for controlling the clutch mechanism 17 for avoiding the slip of the CVT belt 26. In a step S102, the communicator 54 detects a real time speed of each of four wheels 34. In a step S104, the controller 52 evaluates input variables for determining the slip amount of the wheels 34 with the collected data in the vehicle control system 50. For example, the input variables include a torque $T_p$ of the power source 14, a speed $N_i$ of the input shaft 11, speed values $N_p$ and $N_s$ of each of the primary and secondary pulleys 22 and 24, and so on. In the step S104, the controller 52 determines pressure values of each of the clutch mechanism 17 and the primary and secondary pulleys 22 and 24 based on the collected data by the communicator 54. In addition, the controller 52 determines an allowable target speed of the input shaft 11 as the predetermined value.

In a step S106, the controller 52 compares the detected real time speed of the wheels 34 with the allowable target speed of the input shaft 11. In the step S106, if the detected real time speed of the wheels 34 is greater than the predetermined value, the controller 52 determines that a wheel slip of the CVT system 10 is occurred because the real time speed of the wheels 34 exceeds the predetermined value (it means that a spike torque is detected). In a step S108, accordingly, the controller 52 activates the vehicle control system 50 for modulating the clutch mechanism 17 because the wheel slip is occurred in the step S106. In a step S110, when the control system 50 is activated, the controller 52 lowers the torque capacity of the FWD clutch 18 by sending a signal to the hydraulic pressure control 13 for dissipating the spike torque generated by the slippage of the wheels 34. Accordingly, by lowering the torque capacity of the FWD clutch 18, the vehicle control system 50 can avoid a slip of the CVT belt 26 in the CVT system 10.

In a step S112, however, if the detected speed of the wheels 34 is not greater than the predetermined value in the step S106, the controller 52 does not activate the control system 50 and keeps monitoring and evaluating the input variables with the real time speed of the wheels 34.

Figure 6:
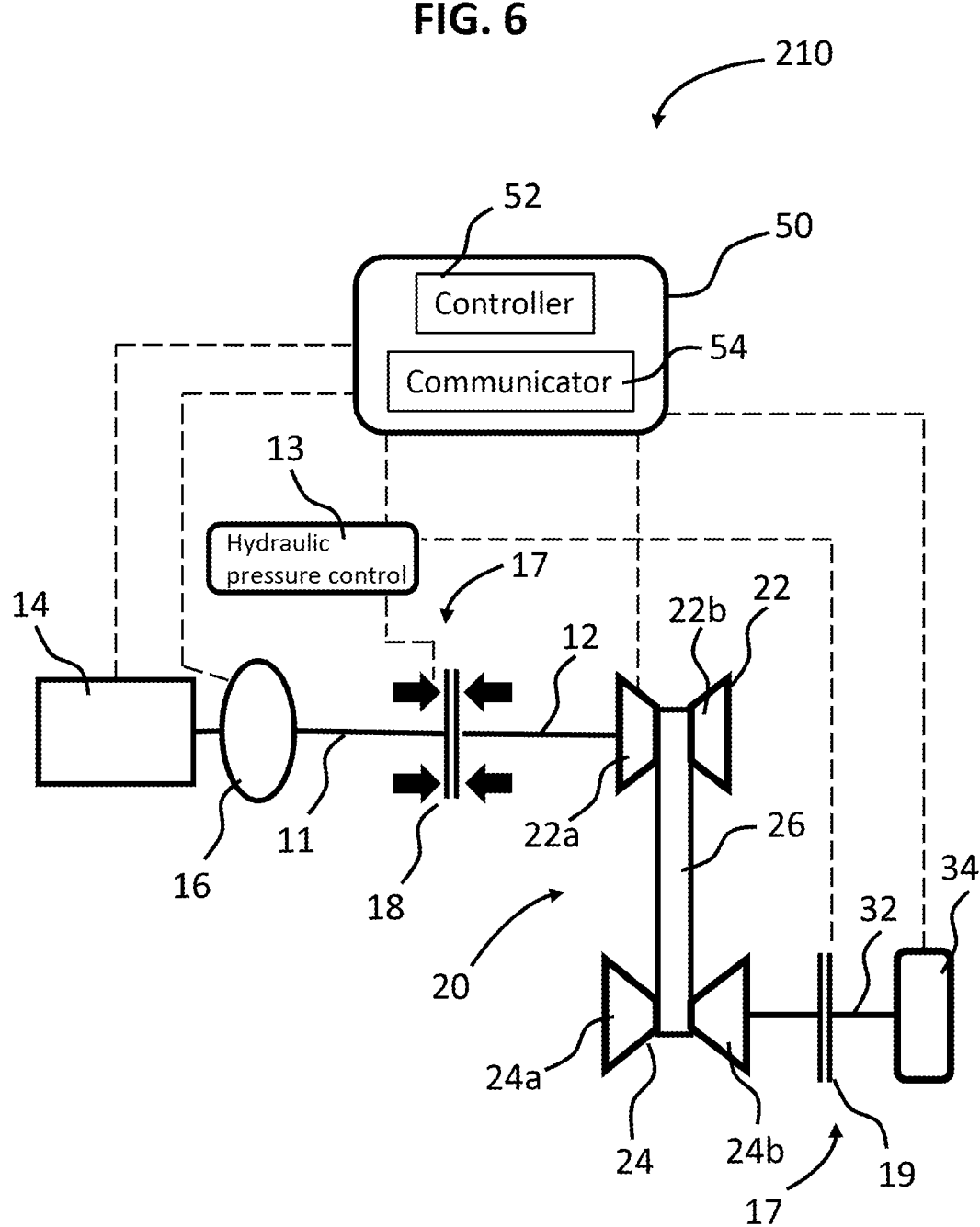
FIG. 6 is a schematic view of a CVT system in accordance with another exemplary form of the present disclosure.

Referring to FIG. 6, in accordance with other forms of the present disclosure, a CVT system 210 further includes an aft clutch 19 as one of the clutch mechanisms 17. The aft clutch 19 is rotatably connected with the secondary shaft 32 and located between the secondary pulley 24 and the wheels 34. However, in accordance with other forms of the present disclosure, the location of the aft clutch 19 may be varied. As described above, the vehicle control system 50 in FIG. 6 can also operate the CVT system 210 for avoiding the slip of the CVT belt 26 when the slip of the wheels 34 is occurred due to the abrupt road condition. While the slip of the wheels 34 is occurred, the controller 52 in FIG. 6 activates the control system 50 for modulating a torque capacity of the aft clutch 19 by communicating with the hydraulic pressure control 13 or the electronic actuator 15 (See FIG. 5). As described above, the vehicle control system 50 may modulate either the FWD clutch 18 or the aft clutch 19 for dissipating the spike torque generated by the wheel slip. In accordance with other forms of the present disclosure, the vehicle control system 50 may modulate both the FWD clutch 18 and the aft clutch 19 at the same time.

The vehicle control system 50 in the present disclosure may be utilized in the existing CVT systems as an additional method for protecting the slip of the CVT belt 26 from the spike torque generated by the wheel slip. Since the existing CVT system 10 may be used, the present disclosure may keep cost and weight lower because no additional component is provided in the CVT system 10 for avoiding the slip of the CVT belt 26. In addition, the vehicle control system 50 is designed as an additional protection against the spike torque generated by the wheel slip condition.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A vehicle control system in a vehicle having a continuously variable transmission (CVT) system including a CVT pulley assembly and a clutch mechanism for transmitting a torque to drive wheels of the vehicle from a power source rotatably connected with an input shaft, the vehicle control system comprising:
   a communicator configured to detect a real time speed of at least one of the drive wheels; and
   a controller configured to:
      evaluate an allowable target speed of the input shaft,
      determine whether to activate the vehicle control system by comparing the real time speed of the at least one of the drive wheels to the allowable target speed, and
      modulate a torque capacity of the clutch mechanism by activating the system when controller determines a wheel slip of the at least one of the drive wheels of the vehicle.

2. The vehicle control system of claim 1, wherein the controller determines as the wheel slip when the detected real time speed of the at least one of the drive wheels exceeds the evaluated allowable target speed of the input shaft.

3. The vehicle control system of claim 1, wherein the controller lowers the torque capacity of the clutch mechanism for dissipating a spike torque generated by the wheel slip.

4. The vehicle control system of claim 1, wherein the clutch mechanism includes a forward (FWD) clutch for transmitting the torque to the CVT pulley assembly from the power source.

5. The vehicle control system of claim 4, wherein the FWD clutch is rotatably connected with the input shaft and a primary shaft between the power source and a primary pulley.

6. The vehicle control system of claim 1, wherein the clutch mechanism includes an aft clutch rotatably connected with a secondary shaft between a secondary pulley and the drive wheels.

7. The vehicle control system of claim 1, wherein the controller modulates the torque capacity of the clutch mechanism by communicating with a hydraulic pressure control.

8. The vehicle control system of claim 1, wherein the controller modulates the torque capacity of the clutch mechanism by communicating with an electronic actuator.

9. A method for controlling a clutch mechanism in a vehicle having a continuously variable transmission (CVT) system including a CVT pulley assembly, the clutch mechanism and a controller for transmitting a torque to drive wheels of the vehicle from a power source rotatably connected with an input shaft, the method comprising steps of:

detecting a real time speed of at least one of the drive wheels;
  evaluating an allowable target speed of the input shaft;
  determining a wheel slip of the at least one of the drive wheels by comparing the real time speed of the at least one of the drive wheels to the allowable target speed;
  activating the controller when the wheel slip is determined; and
  modulating a torque capacity of the clutch mechanism for dissipating a spike torque generated by the wheel slip.

10. The method of claim 9, wherein the wheel slip is determined when the detected real time speed of the at least one of the drive wheels exceeds the evaluated allowable target speed of the input shaft.

11. The method of claim 9, the controller lowers the torque capacity of the clutch mechanism for dissipating a spike torque generated by the wheel slip.

12. The method of claim 9, wherein the clutch mechanism includes a forward (FWD) clutch for transmitting the torque to the CVT pulley assembly from the power source.

13. The method of claim 9, wherein the FWD clutch is rotatably connected with the input shaft and a primary shaft between the power source and a primary pulley.

14. The method of claim 9, wherein the clutch mechanism includes an aft clutch rotatably connected with a secondary shaft between a secondary pulley and the drive wheels.

15. The method of claim 9, wherein the controller modulates the torque capacity of the clutch mechanism by communicating with a hydraulic pressure control.

16. The method of claim 9, wherein the controller modulates the torque capacity of the clutch mechanism by communicating with an electronic actuator.

* * * * *